US 9,259,687 B2

(12) United States Patent
Weissenbach et al.

(10) Patent No.: US 9,259,687 B2
(45) Date of Patent: Feb. 16, 2016

(54) BAG FOR A CIRCUIT OF A BIOLOGICAL LIQUID TREATMENT INSTALLATION

(71) Applicant: EMD Millipore Corporation, Billerica, MA (US)

(72) Inventors: Jean-Louis Weissenbach, Ville (FR); Sebastien Cirou, Schiltigheim (FR)

(73) Assignee: EMD Millipore Corporation, Billerica, MA (US)

( * ) Notice: Subject to any disclaimer, the term of this patent is extended or adjusted under 35 U.S.C. 154(b) by 493 days.

(21) Appl. No.: 13/889,616

(22) Filed: May 8, 2013

(65) Prior Publication Data
US 2013/0240065 A1 Sep. 19, 2013

Related U.S. Application Data

(62) Division of application No. 13/161,975, filed on Jun. 16, 2011.

(30) Foreign Application Priority Data

Jun. 23, 2010 (FR) ..................... 10 55025

(51) Int. Cl.
  *B01D 63/00* (2006.01)
  *B01D 61/20* (2006.01)

(52) U.S. Cl.
  CPC .............. *B01D 63/00* (2013.01); *B01D 61/20* (2013.01); *B01D 2313/105* (2013.01);
  (Continued)

(58) Field of Classification Search
  CPC .... B01D 61/20; B01D 63/00; B01D 2313/13; B01D 2313/125; B01D 2313/90; B01D 2315/10; B01D 2313/105; B01D 2313/18
  USPC .............. 210/635, 656, 198.2, 321.6, 321.72, 210/541; 137/343, 377
  See application file for complete search history.

(56) References Cited

U.S. PATENT DOCUMENTS

| 2,413,853 | A | 1/1947 | Zademach et al. |
| 2,787,403 | A | 4/1957 | Carr et al. |

(Continued)

FOREIGN PATENT DOCUMENTS

| CN | 101281204 A | 10/2008 |
| DE | 10 2006 059 459 A1 | 7/2008 |

(Continued)

OTHER PUBLICATIONS

Office Action mailed Oct. 25, 2013 in co-pending U.S. Appl. No. 13/187,698.

(Continued)

*Primary Examiner* — Ernest G Therkorn
(74) *Attorney, Agent, or Firm* — Nields, Lemack & Frame, LLC (57) ABSTRACT

The invention concerns a bag comprising a first conduit (13C) which extends longitudinally between a flow pump connector (11C) emerging on a first side (68) and a tangential filter connector (11M) emerging on a second side (69); a second conduit (13B) which extends longitudinally from a first side of said conduit (13C) between a supply container connector (11B) emerging on said first side (68), and another tangential flow connector (11N) emerging on said second side (69); a third conduit (13H) which extends from a second side of said conduit (13C), starting at a collecting container connector (11J), until it enters said first conduit (13C); and a fourth conduit (13A) which extends from the first side of said conduit (13C), starting at a transfer pump connector (11A), until it enters said second conduit (13B).

6 Claims, 7 Drawing Sheets

(52) U.S. Cl.
CPC ...... *B01D 2313/125* (2013.01); *B01D 2313/13* (2013.01); *B01D 2313/18* (2013.01); *B01D 2313/90* (2013.01); *B01D 2315/10* (2013.01)

(56) References Cited

U.S. PATENT DOCUMENTS

| | | |
|---|---|---|
| 2,941,575 A | 6/1960 | Malmberg et al. |
| 3,022,229 A | 2/1962 | Heden |
| 3,179,117 A | 4/1965 | Gibson et al. |
| 3,667,487 A | 6/1972 | Schoenbeck et al. |
| 3,772,154 A | 11/1973 | Isenberg et al. |
| 3,774,762 A | 11/1973 | Lichtenstein |
| 4,113,623 A | 9/1978 | Koether et al. |
| 4,332,750 A | 6/1982 | Roggenburg, Jr. et al. |
| 4,370,983 A | 2/1983 | Lichtenstein |
| 4,784,751 A | 11/1988 | McGehee |
| 4,790,118 A | 12/1988 | Chilcoate |
| 4,852,851 A | 8/1989 | Webster |
| 4,855,236 A | 8/1989 | Levin |
| 4,915,119 A | 4/1990 | Franklin |
| 5,019,257 A | 5/1991 | Suzuki et al. |
| 5,141,866 A | 8/1992 | Levin |
| 5,265,912 A | 11/1993 | Natividad |
| 5,290,518 A | 3/1994 | Johnson |
| 5,342,463 A | 8/1994 | Addeo et al. |
| 5,520,885 A | 5/1996 | Coelho et al. |
| 5,628,908 A | 5/1997 | Kamen et al. |
| 5,645,723 A | 7/1997 | Fujishiro et al. |
| 5,678,568 A | 10/1997 | Uchikubo et al. |
| 5,711,916 A | 1/1998 | Riggs et al. |
| 5,738,645 A | 4/1998 | Plotkin |
| 5,985,653 A | 11/1999 | Armstrong et al. |
| 6,073,942 A | 6/2000 | Heneveld, Sr. |
| 6,099,734 A | 8/2000 | Boggs et al. |
| 6,129,099 A | 10/2000 | Foster et al. |
| 6,146,124 A | 11/2000 | Coelho et al. |
| 6,186,998 B1 | 2/2001 | Inuzuka et al. |
| 6,213,334 B1 | 4/2001 | Coelho et al. |
| 6,228,255 B1 | 5/2001 | Peterson et al. |
| 6,232,115 B1 | 5/2001 | Coelho et al. |
| 6,303,025 B1 | 10/2001 | Houchens |
| 6,361,642 B1 | 3/2002 | Bellamy et al. |
| 6,670,169 B1 | 12/2003 | Schob et al. |
| 6,808,675 B1 | 10/2004 | Coelho et al. |
| 6,902,706 B1 | 6/2005 | Colin et al. |
| 6,982,063 B2 | 1/2006 | Hamel et al. |
| 7,153,286 B2 | 12/2006 | Busby et al. |
| 7,326,355 B2 | 2/2008 | Graetz et al. |
| 7,485,224 B2 | 2/2009 | Jones et al. |
| 7,648,627 B2 | 1/2010 | Beden et al. |
| 7,666,022 B2 | 2/2010 | Ammann et al. |
| 7,867,189 B2 | 1/2011 | Childers et al. |
| 7,935,074 B2 | 5/2011 | Plahey et al. |
| 7,935,253 B2 | 5/2011 | Beulay et al. |
| 8,114,276 B2 | 2/2012 | Childers et al. |
| 8,163,172 B2 | 4/2012 | Beulay et al. |
| 8,343,356 B2 | 1/2013 | Beulay et al. |
| 8,383,397 B2 | 2/2013 | Wojciechowski et al. |
| 8,505,959 B2 | 8/2013 | Darling, III |
| 8,506,798 B2 | 8/2013 | Beulay et al. |
| 8,557,113 B2 | 10/2013 | Beulay et al. |
| 8,900,454 B2 | 12/2014 | Cirou et al. |
| 8,906,229 B2 | 12/2014 | Cirou et al. |
| 8,916,045 B2 | 12/2014 | Reinbigler et al. |
| 8,921,096 B2 | 12/2014 | Weissenbach et al. |
| 9,051,929 B2 | 6/2015 | Cirou et al. |
| 2003/0040104 A1 | 2/2003 | Barbera-Guillem |
| 2004/0031507 A1 | 2/2004 | Ross et al. |
| 2004/0104153 A1 | 6/2004 | Yang |
| 2004/0222341 A1 | 11/2004 | Breda et al. |
| 2004/0259240 A1 | 12/2004 | Fadden |
| 2005/0254879 A1 | 11/2005 | Gundersen et al. |
| 2006/0024212 A1 | 2/2006 | Hwang |
| 2006/0057030 A1 | 3/2006 | Lee et al. |
| 2006/0118472 A1 | 6/2006 | Schick et al. |
| 2006/0226333 A1 | 10/2006 | Newkirk |
| 2007/0095364 A1 | 5/2007 | Watt |
| 2007/0112297 A1 | 5/2007 | Plahey et al. |
| 2007/0128087 A1 | 6/2007 | Cannizzaro et al. |
| 2007/0199875 A1 | 8/2007 | Moorey et al. |
| 2007/0278155 A1 | 12/2007 | Lo et al. |
| 2008/0023045 A1 | 1/2008 | Miller et al. |
| 2008/0057274 A1 | 3/2008 | Hagiwara et al. |
| 2008/0213143 A1 | 9/2008 | Gyonouchi et al. |
| 2008/0254962 A1 | 10/2008 | Mizuo et al. |
| 2009/0050756 A1 | 2/2009 | Newkirk et al. |
| 2009/0101219 A1 | 4/2009 | Martini et al. |
| 2009/0101552 A1 | 4/2009 | Fulkerson et al. |
| 2009/0111179 A1 | 4/2009 | Hata et al. |
| 2009/0180933 A1 | 7/2009 | Kauling et al. |
| 2009/0215602 A1 | 8/2009 | Min et al. |
| 2009/0294349 A1 | 12/2009 | Beulay et al. |
| 2009/0314970 A1 | 12/2009 | McAvoy et al. |
| 2010/0108920 A1 | 5/2010 | Tatarek |
| 2010/0126927 A1 | 5/2010 | Blankenstein et al. |
| 2010/0187167 A1 | 7/2010 | Reinbigler et al. |
| 2010/0204765 A1 | 8/2010 | Hall et al. |
| 2010/0206785 A1 | 8/2010 | Beulay et al. |
| 2010/0234805 A1 | 9/2010 | Kaufmann et al. |
| 2011/0174716 A1 | 7/2011 | Beulay et al. |
| 2011/0297866 A1 | 12/2011 | Weber |
| 2011/0303306 A1 | 12/2011 | Weber |
| 2012/0006736 A1 | 1/2012 | Cirou et al. |
| 2012/0018018 A1 | 1/2012 | Cirou et al. |
| 2012/0031510 A1 | 2/2012 | Weissenbach et al. |
| 2012/0138173 A1 | 6/2012 | Cirou et al. |
| 2012/0138522 A1 | 6/2012 | Cirou et al. |
| 2012/0145616 A1 | 6/2012 | Weissenbach et al. |
| 2012/0160342 A1 | 6/2012 | Weissenbach et al. |
| 2012/0160356 A1 | 6/2012 | Reinbigler et al. |
| 2012/0168390 A1 | 7/2012 | Beulay et al. |
| 2012/0248025 A1 | 10/2012 | Reinbigler et al. |
| 2013/0087490 A1 | 4/2013 | Beulay et al. |
| 2013/0193073 A1 | 8/2013 | Hogard et al. |
| 2013/0210130 A1 | 8/2013 | Larcher et al. |
| 2013/0236130 A1 | 9/2013 | Cirou et al. |
| 2014/0069537 A1 | 3/2014 | Cirou et al. |
| 2015/0008184 A1 | 1/2015 | Cirou et al. |
| 2015/0013773 A1 | 1/2015 | Cirou et al. |

FOREIGN PATENT DOCUMENTS

| | | |
|---|---|---|
| DE | 10 2008 003 823 A1 | 7/2008 |
| EP | 0479047 A2 | 4/1992 |
| EP | 0803723 A1 | 10/1997 |
| EP | 1195171 A2 | 4/2002 |
| EP | 1239277 A1 | 9/2002 |
| EP | 2044964 A2 | 4/2009 |
| EP | 2130903 A1 | 12/2009 |
| EP | 2208534 A1 | 7/2010 |
| EP | 2228635 A1 | 9/2010 |
| FR | 2241615 A1 | 3/1975 |
| FR | 2673853 A1 | 9/1992 |
| FR | 2931838 A1 | 12/2009 |
| FR | 2940145 A1 | 6/2010 |
| GB | 1434786 | 5/1976 |
| GB | 2448858 A | 11/2008 |
| JP | 62-081543 A | 4/1987 |
| JP | 2010-502405 A | 1/2010 |
| WO | 00/48703 A1 | 8/2000 |
| WO | 2005/090403 A2 | 9/2005 |
| WO | 2006/043895 A1 | 4/2006 |
| WO | 2007/094091 A1 | 8/2007 |
| WO | 2008/033788 A2 | 3/2008 |
| WO | 2008/064242 A2 | 5/2008 |
| WO | 2008/071351 | 6/2008 |
| WO | 2008/120021 A1 | 10/2008 |
| WO | 2009/017614 A1 | 2/2009 |
| WO | 2009/073567 A1 | 6/2009 |

(56) References Cited

FOREIGN PATENT DOCUMENTS

| WO | 2009/157852 A1 | 12/2009 |
| WO | 2010/084432 A1 | 7/2010 |
| WO | 2010/094249 A1 | 8/2010 |

OTHER PUBLICATIONS

Office Action mailed Dec. 17, 2013 in co-pending U.S. Appl. No. 12/685,140.
Office Action mailed Jan. 16, 2014 in co-pending U.S. Appl. No. 13/004,425.
Notice of Allowance mailed Feb. 18, 2014 in co-pending U.S. Appl. No. 13/116,508.
Notice of Allowance mailed Feb. 3, 2014 in co-pending U.S. Appl. No. 13/430,734.
French Search Report dated Feb. 9, 2009 in co-pending foreign patent application No. FR 0853629.
French Search Report dated Oct. 16, 2009 in co-pending French Patent Application No. FR 0950435.
Chinese Communication, with English translation, dated Sep. 27, 2012 in co-pending Chinese patent application No. CN 201010004496.1.
International Search Report and Written Opinion received for PCT application No. PCT/IB2010/050102, mailed on May 7, 2010, 10 pages.
International Preliminary Report on Patentability received for PCT application No. PCT/IB2010/050102, mailed on Aug. 4, 2011, 8 pages.
Extended European Search Report and Search Opinion received for EP Patent Application No. 10290005.7, mailed on May 17, 2010, 5 pages.
French Search Report dated Sep. 24, 2010 in co-pending foreign patent application No. FR 1050209.
French Search Report dated Nov. 25, 2010 in co-pending foreign patent application No. FR 1054514.
French Search Report dated Nov. 12, 2010 in corresponding foreign patent application No. FR 1055025.
French Search Report dated Feb. 3, 2011 in co-pending foreign patent application No. FR 1055026.
French Search Report dated May 24, 2011 in co-pending foreign patent application No. FR 1056421.
Extended European Search Report for co-pending foreign patent application No. EP 09290938.1, mailed Apr. 6, 2010.
French Search Report dated Nov. 22, 2010 in co-pending foreign patent application No. FR 1054517.
French Search Report dated Nov. 22, 2010 in co-pending foreign patent application No. FR 1054516.
French Search Report dated Nov. 17, 2011 in co-pending foreign patent application No. FR 1152556.
International Search Report mailed Jun. 8, 2011 in co-pending PCT Application No. PCT/IB2011/050089.
Written Opinion of the International Searching Authority mailed Jun. 8, 2011 in co-pending PCT application No. PCT/IB2011/050089.
International Preliminary Report on Patentability mailed Jul. 26, 2012 in co-pending PCT application No. PCT/IB2011/050089.
International Search Report/Written Opinion mailed Sep. 30, 2011 in co-pending PCT Application No. PCT/IB2011/052447.
International Preliminary Report on Patentability mailed Dec. 20, 2012 in co-pending PCT application No. PCT/IB2011/052447.
International Search Report mailed Sep. 29, 2011 in corresponding PCT Application No. PCT/IB2011/052676.
Written Opinion of the International Searching Authority mailed Sep. 29, 2011 in co-pending PCT application No. PCT/IB2011/052679.
International Preliminary Report on Patentability mailed Jan. 10, 2013 in co-pending PCT application No. PCT/IB2011/052679.
International Search Report mailed Aug. 29, 2011 in co-pending PCT Application No. PCT/IB2011/052679.
Written Opinion of the International Searching Authority mailed Aug. 29, 2011 in co-pending PCT application No. PCT/IB2011/052679.
International Search Report mailed Aug. 2, 2011 in co-pending PCT Application No. PCT/IB2011/052448.
Written Opinion of the International Searching Authority mailed Aug. 2, 2011 in co-pending PCT application No. PCT/IB2011/052448.
International Preliminary Report on Patentability mailed Dec. 20, 2012 in co-pending PCT application No. PCT/IB2011/052448.
International Search Report/Written Opinion mailed Sep. 28, 2011 in co-pending PCT Application No. PCT/IB2011/052450.
International Preliminary Report on Patentability mailed Dec. 20, 2012 in co-pending PCT application No. PCT/IB2011/052450.
International Search Report mailed Sep. 4, 2012 in co-pending PCT application No. PCT/IB2012/051424.
Office Action mailed Feb. 22, 2013 in co-pending U.S. Appl. No. 13/688,255.
Notice of Allowance mailed Jun. 18, 2013 in co-pending U.S. Appl. No. 13/688,255.
Office Action—Restriction—mailed Jan. 27, 2012 in co-pending U.S. Appl. No. 12/685,140.
Office Action mailed Jun. 28, 2012 in co-pending U.S. Appl. No. 12/685,140.
Final Rejection mailed Jan. 24, 2013 in co-pending U.S. Appl. No. 12/685,140.
Office Action—Restriction—mailed Apr. 25, 2013 in corresponding U.S. Appl. No. 13/161,975.
Notice of Allowance mailed May 13, 2013 in corresponding U.S. Appl. No. 13/161,975.
Notice of Allowance mailed Apr. 1, 2013 in co-pending U.S. Appl. No. 13/161,983.
Office Action mailed Jun. 5, 2012 in co-pending U.S. Appl. No. 12/592,901.
Office Action mailed May 9, 2013 in co-pending U.S. Appl. No. 12/592,901.
Office Action—Restriction—mailed Apr. 2, 2013 in co-pending U.S. Appl. No. 13/153,804.
Notice of Allowance mailed May 6, 2013 in co-pending U.S. Appl. No. 13/153,804.
Office Action—Restriction—mailed Oct. 15, 2013 in co-pending U.S. Appl. No. 13/004,425.
Office Action mailed Oct. 9, 2013 in co-pending U.S. Appl. No. 13/116,508.
Office Action mailed Oct. 18, 2013 in co-pending U.S. Appl. No. 13/116,508.
Notice of Allowance mailed Sep. 6, 2013 in co-pending U.S. Appl. No. 12/592,901, now U.S. Pat. No. 8,557,113.
Office Action mailed Oct. 23, 2013 in co-pending U.S. Appl. No. 13/153,809.
Office Action mailed Dec. 11, 2014 in co-pending U.S. Appl. No. 13/414,843.
Notice of Allowance mailed Mar. 18, 2014 in co-pending U.S. Appl. No. 13/116,508.
Final Rejection mailed Mar. 26, 2014 in co-pending U.S. Appl. No. 13/187,698.
Notice of Allowance mailed Apr. 1, 2014 in co-pending U.S. Appl. No. 13/153,809.
Notice of Allowance mailed Sep. 3, 2014 in co-pending U.S. Appl. No. 13/116,508.
Notice of Allowance mailed Sep. 2, 2014 in co-pending U.S. Appl. No. 13/153,809.
Notice of Allowance mailed Sep. 29, 2014 in co-pending U.S. Appl. No. 13/430,734.
Notice of Allowance mailed Nov. 6, 2014 in co-pending U.S. Appl. No. 13/187,698.
Notice of Allowance mailed Apr. 14, 2014 in co-pending U.S. Appl. No. 13/116,508.
Notice of Allowance mailed Apr. 14, 2014 in co-pending U.S. Appl. No. 13/153,809.
Final Rejection mailed Jun. 23, 2014 in co-pending U.S. Appl. No. 12/685,140.
Office Action mailed Aug. 25, 2014 in co-pending U.S. Appl. No. 13/004,425.
Office Action mailed Jul. 30, 2014 in co-pending U.S. Appl. No. 14/080,826.

(56) References Cited

OTHER PUBLICATIONS

Notice of Allowance mailed Aug. 11, 2014 in co-pending U.S. Appl. No. 13/116,508.
Office Action mailed Jul. 24, 2014 in co-pending U.S. Appl. No. 13/187,698.
Notice of Allowance mailed Aug. 8, 2014 in co-pending U.S. Appl. No. 13/153,809.
Notice of Allowance mailed Jul. 2, 2014 in co-pending U.S. Appl. No. 13/430,734.
Notice of Allowance mailed Aug. 12, 2014 in co-pending U.S. Appl. No. 13/430,734.
Korean communication, with English translation, dated Jul. 31, 2014 in co-pending Korean patent application No. 10-2013-7000355.
Korean communication, with English translation, dated Jul. 31, 2014 in corresponding Korean patent application No. KR 10-2013-7001692.
Korean communication, with English translation, dated Jul. 31, 2014 in co-pending Korean patent application No. KR 10-2013-7000366.
Korean communication, with English translation, dated Jul. 31, 2014 in co-pending Korean patent application No. KR 10-2013-7000356.
Final Rejection mailed Aug. 19, 2015 in co-pending U.S. Appl. No. 12/685,140.
Office action mailed Aug. 7, 2015 in co-pending U.S. Appl. No. 13/414,843.
Notice of Allowance mailed Jul. 13, 2015 in co-pending U.S. Appl. No. 14/080,826.
Notice of Allowance mailed Jul. 28, 2015 in co-pending U.S. Appl. No. 14/080,826.
Notice of Allowance mailed Jul. 20, 2015 in co-pending U.S. Appl. No. 13/161,975.
Office Action mailed Jan. 6, 2015 co-pending U.S. Appl. No. 12/685,140.
Final Rejection mailed Feb. 5, 2015 in co-pending U.S. Appl. No. 13/414,843.
Notice of Allowance mailed Feb. 2, 2015 in co-pending U.S. Appl. No. 13/004,425.
Final Rejection mailed Mar. 11, 2015 in co-pending U.S. Appl. No. 14/080,826.
Notice of Allowance mailed Jul. 2, 2015 in co-pending U.S. Appl. No. 13/161,983
Notice of Allowance mailed Jul. 2, 2015 in co-pending U.S. Appl. No. 13/153,804.

BAG FOR A CIRCUIT OF A BIOLOGICAL LIQUID TREATMENT INSTALLATION

This application is a divisional of U.S. Ser. No. 13/161,975, filed Jun. 16, 2011, which claims priority from French Application No. 1055025 filed Jun. 23, 2010, the disclosures of which are incorporated herein by reference.

The invention relates to a bag for device of a biological liquid treatment installation, particularly but not exclusively, for purifying a biopharmaceutical liquid in order to obtain products such as monoclonal antibodies, vaccines or recombinant proteins.

The invention also concerns a device of an biological liquid treatment installation.

It is known that biopharmaceutical liquids are in general obtained by culture in a bioreactor and that they must then be treated to achieve the required characteristics of purity, concentration, absence of viruses, etc.

The purification is carried out by means of a succession of treatments such as clarification, to eliminate the residues from the bioreactor culture, and viral filtration sometimes followed by diafiltration and concentration by tangential flow filtration (TFF). Other operations exist concerning purification, such as chromatography (XMO).

The purification treatments are essentially carried out by filtering operations in a circuit leading to a container for collecting the treated liquid.

A number of types of container containing liquids can be connected to the inlet of the circuit, such as the source container that contains the product to be treated, but also the containers containing a cleaning liquid such as sodium hydroxide (NaOH), a rinsing liquid such as pure water for injection or a buffer liquid such as a saline solution. In addition to the container for collecting the treated liquid, various other containers for collecting cleaning, rinsing or buffer liquid, or for collecting residues, can be connected to the outlet of the circuit.

In a production context the liquid treatments can be carried out sequentially, the collecting container for the first treatment potentially becoming the source container for the next treatment, and so on until the last treatment is carried out.

These treatments are conventionally carried out in dedicated installations comprising stainless steel pipes and other parts such as tanks or filter housings, which necessitate operations before and after the actual treatment, which are relatively onerous, in particular operations of cleaning after use.

Within the last few years, these treatments have alternatively been carried out in installations in which the components in contact with the liquid are single-use components.

Such single-use components have the advantage of avoiding cleaning operations, but, to provide the required degree of security, the implementation of an installation with such components necessitates operations of selection, assembly and verification which are relatively complex.

This is especially the case when the number of pipes and other circuit components (connectors, valves, etc.) is high and/or when the operating pressure is high.

According to a first aspect, the invention is directed to providing a bag enabling the simple, economical and convenient implementation of treatments for biological liquid.

For this, the invention concerns a bag for a circuit of an installation for treatment of a biological liquid by tangential filtration, comprising:

a plurality of connectors and a network for conveying liquid between said connectors, said conveying network being formed by a plurality of conduits; and
 two flexible films fastened to each other, said conduits being formed between the two said flexible films;
 a first conduit extending longitudinally between a flow pump connector emerging on a first side of said bag and a tangential filter connector emerging on a second side of said bag which is an opposite side to said first side;
 a second conduit extending longitudinally from a first side of said conduit between a supply container connector emerging on said first side of said bag, and another tangential filter connector emerging on said second side of said bag which is an opposite side to said first side;
 a third conduit extending from a second side of said conduit, which is an opposite side to said first side of said conduit, starting at a collecting container connector, until it enters said first conduit; and
 a fourth conduit extending from the first side of said conduit, starting at a transfer pump connector, until it enters said second conduit;
 whereby said bag is configured such that the liquid to treat passes within said bag via said fourth conduit, then passes to a supply container via said second conduit, then passes as far as the tangential filter by the action of a flow pump via said first conduit, a first treated liquid passing from the tangential filter to the supply container via said second conduit and a second treated liquid passing from the tangential filter to a collecting container via said first conduit.

By virtue of the invention, it is possible to directly supply the tangential filter by the first conduit, the first treated liquid furthermore being sent directly back from the tangential filter by virtue of the second conduit.

Thus the so-called dead volume of liquid to treat and of treated liquid is minimized in the bag and thereby in the circuit.

Furthermore, the bag is configured in order for the longitudinal direction to coincide with the horizontal such that the second and fourth conduits are above the first conduit and the third conduit is below the first conduit.

Furthermore, the bag according to the invention fully complies with the constraints imposed upon a circuit in two dimensions (which prevents the crossing of conduits), by virtue of the arrangement of the first conduit and second conduit which are arranged parallel with equal spacing between their opposite respective connectors.

The first conduit nevertheless has a slight negative slope between the flow pump connector and the junction between the first conduit and the third conduit, and, furthermore, with a slight negative slope between the tangential filter connector and that same junction, for flow by draining of the second processed liquid coming from the filter.

To be precise, in this direction of flow, there is no pump to assist flow, contrary to the earlier conveying of the liquid to treat to the filter.

According to particularly simple, convenient and economical features of the bag according to the invention:

the bag comprises a fifth conduit connected to a transfer pump connector, and a sixth conduit which extends from a source container connector until it enters said fifth conduit;
 the bag comprises at least a seventh conduit which extends from a buffer and/or cleaning container connector until it enters said fifth conduit;
 the bag comprises an eighth conduit which extends between an air filter connector and a rinsing container connector, said fifth conduit entering said eighth conduit; and the bag comprises at least a ninth conduit which extends between a tangential filter connector and a waste container connector;

According to a second aspect, the invention also concerns a device for an installation for biological liquid treatment by tangential filtration, which comprises a circuit comprising:

a bag provided with a plurality of connectors and a network for conveying liquid between said connectors, said conveying network being formed by a plurality of conduits, the bag further comprising two flexible films fastened to each other, said conduits being formed between said flexible films;

a press comprising a first shell and a second shell mounted on said first shell, said first shell and second shell cooperating with said bag to form the conduits of said conveying network between said flexible films, by clamping said bag between said first shell and said second shell; and a plurality of valves;

a first conduit extending longitudinally between a flow pump connector emerging on a first side of said bag and a tangential filter connector emerging on a second side of said bag which is an opposite side to said first side;

a second conduit extending longitudinally from a first side of said conduit between a supply container connector emerging on said first side of said bag, and another tangential filter connector emerging on said second side of said bag which is an opposite side to said first side;

a third conduit extending from a second side of said conduit, which is an opposite side to said first side of said conduit, starting at a collecting container connector, until it enters said first conduit; and a fourth conduit extending from the first side of said conduit from a transfer pump connector until it enters said second conduit;

at least a first valve being situated on said first conduit, at least a second valve being situated on said second conduit, a third valve being situated on said third conduit, and a fourth valve being situated on said fourth conduit.

By virtue of the invention, the device for the treatment installation is particularly convenient since it enables the treatment by tangential filtration to be carried out (by the opening and closing of valves thereby permitting or preventing the flow of liquid in the conduits) simply and with less space occupied.

Furthermore, depending on the treatments carried out, the biological liquid treatment installation comprises, in addition to the device according to the invention, one or more other devices, for example juxtaposed against the device according to the invention.

This other device or these devices is or are provided with the treatment components of the surroundings mentioned above formed in particular by one or more pumps, for example of the peristaltic type, and/or by a source container containing the product to treat and/or by a treated liquid collecting container, these treatment components of the surroundings each being connected to the bag, directly or not.

According to particularly simple, convenient and economical features of the device according to the invention:

the bag comprises a fifth conduit connected to a transfer pump connector, and a sixth conduit extending from a source container connector until it enters said fifth conduit, and the device comprises a fifth valve situated on said fifth conduit and a sixth valve situated on said sixth conduit;

the bag comprises at least a seventh conduit which extends from a buffer and/or cleaning container connector until it enters said fifth conduit, and the device comprises at least a seventh valve situated on said seventh conduit;

the bag comprises an eighth conduit which extends between an air filter connector and a rinsing container connector, said fifth conduit entering said eighth conduit, and the device comprises at least one eighth valve situated on said eighth conduit;

the bag comprises at least a ninth conduit which extends between a tangential filter connector and a waste container connector, and the device comprises at least a ninth valve situated on said ninth conduit; and the device comprises a pressure sensor situated on at least one said conduit.

Figure 1:
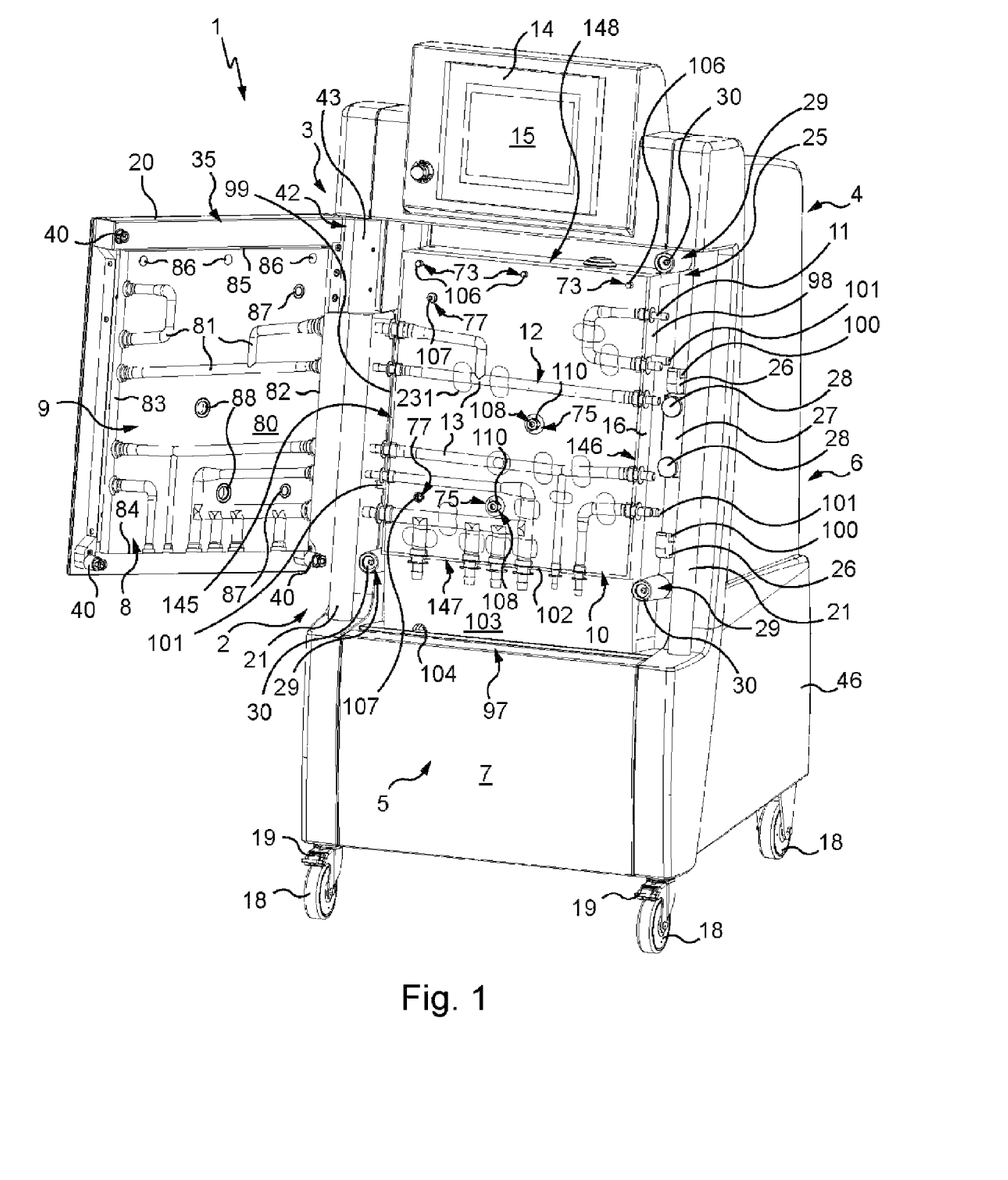
FIG. 1 is a perspective view of a device of the installation for treatment of liquid by tangential filtration.
Figure 2:
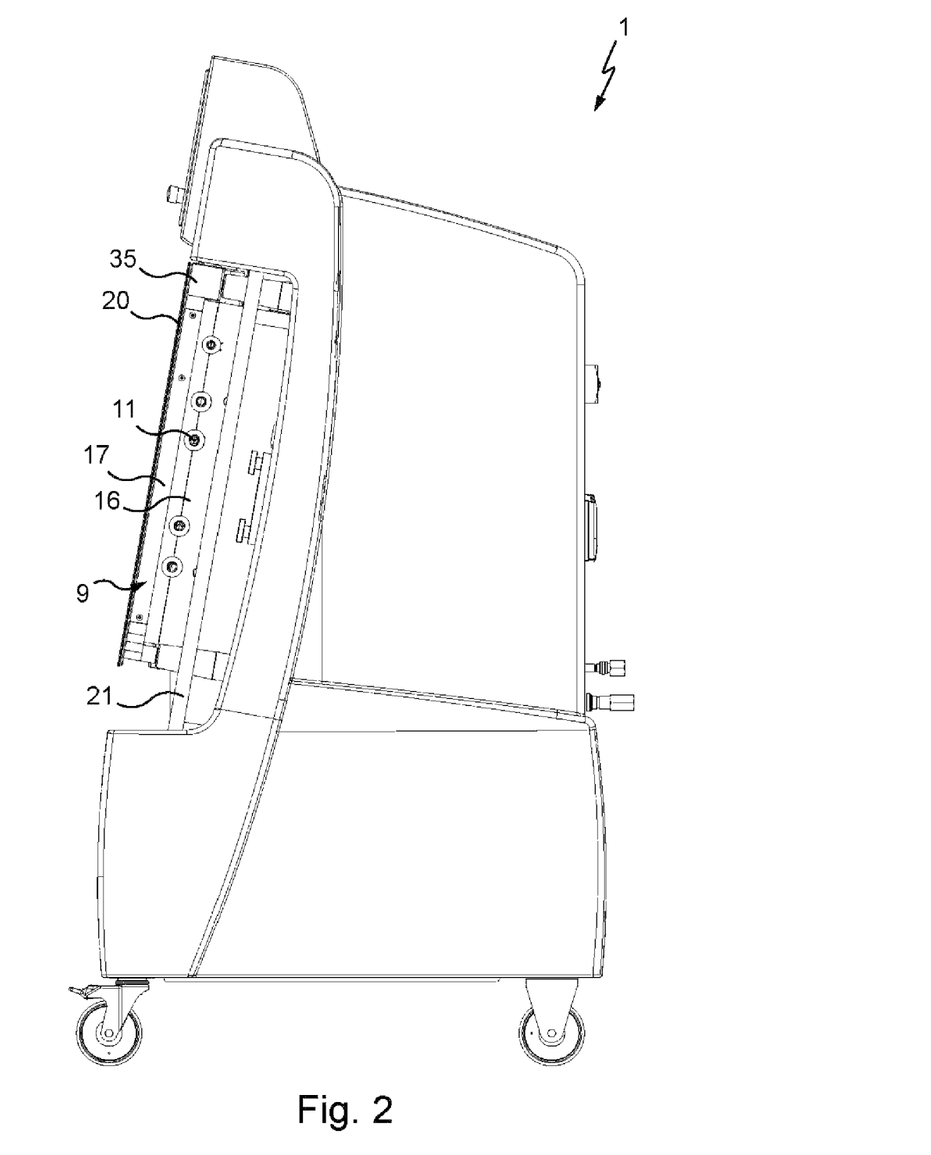
FIG. 2 is a side view of the device.

The disclosure of the invention will now be continued with the description of embodiments, given below by way of illustrative and non-limiting example, with reference to the accompanying drawings, in which:

FIGS. 1 and 2 illustrate a device 1 for an installation for biological liquid treatment by tangential filtration.

The device 1 is of generally parallelepiped form.

This device 1 comprises a base 2 having a first lateral face 3, a second lateral face 4 which is an opposite face to the first lateral face 3, a front face 5 meeting the first and second lateral faces 3 and 4, and a back face 6 which is an opposite face to the front face 5 and which meets the first and second lateral faces 3 and 4.

The device 1 further comprises a circuit 8 provided with a press 9 and a bag 10, which comprises a plurality of connectors 11 (11A to 11P in FIGS. 6 and 7) for liquid and a network 12 for conveying liquid between these connectors 11 including conduits 13 (13A to 13K in FIGS. 6 and 7), as will be seen in more detail later.

The press 9 comprises two shells 16 and 17 each formed from a solid block of rigid material.

Here, the shells 16 and 17 are of polyoxymethylene (POM), also called acetal, and each has a generally parallelepiped form.

The shell 16 is mounted on the front face 5 of the base 2.

The device 1 further comprises a door 20 hinged to the base 2.

The shell 17 is mounted in that door 20.

The device 1 has a closed door position in which the door 20 is closed and covers the shell 16 (FIG. 2), and another position in which the bag 10 is carried only by the shell 16 (FIG. 1).

In this other position, the shell 17 is away from the shell 16.

In the closed door position, the bag 10 is inserted between the two shells 16 and 17.

The device 1 is provided, at the bottom, with a closed bay 46 intended to receive one or more tanks (represented diagrammatically in FIG. 6) comprising a bag, which tanks form for example a container for collecting treated liquids or a waste container as will be seen later.

This bay 46 is closed by a sliding panel 7 disposed on the front face 5 of the device 1, which panel 7 is adapted to be moved in translation downwardly then towards the back of the device 1 (see the arrows in FIG. 1) so as to insert and withdraw the tanks.

A control panel 14 is arranged at the top of the front face 5 of the device 1.

This control panel 14 is provided with a graphical touch interface 15 enabling the biological liquid treatment process to be verified and controlled.

This control panel 14 is thus arranged at a height enabling a user to make use of it.

In order to make it easier to move, the device 1 is in the form of a cart mounted on four castors 18 (of which three can be seen in FIG. 1), with two castors situated under the front face of the device 5 which comprises a brake 19, and with the device 1 furthermore having two handles 21 on respective opposite sides of the front face 5, in the vicinity of the respective lateral faces 3 and 4.

The device 1 comprises an inclined chassis 25 at its front face 5.

On each of its left and right sides, the chassis 25 comprises two superposed L-shaped hooking claws 26 emerging from the respective side and extending upwardly.

A support plate 27 is fastened to the right side of the chassis 25, between the two hooking claws 26.

This support plate 27 is disposed in the immediate vicinity under the hooking claw 26 situated higher on the right side, so as to leave free access to the hooking claw 26 situated lower down on that same right side.

The support plate 27 comprises two fastening heads 28 on which a platform (not shown) is adapted to be fastened so as to dispose thereon the tangential filter necessary for the treatment of the biological liquid.

The base 2 of the device 1 further comprises devices 29 which, with complementary devices 40 of the door 20, enable the positioning and the locking of that door 20 in the closed door position.

There are three of the devices 29, which are situated at the corners of the chassis 25, respectively at top right, bottom right, and bottom left.

These devices 29 each comprise a body, an annular shoulder (not shown), a head connected to that annular shoulder, that head having the form of a conical tube and being provided internally with a rod 30 with a conical tip. The body comprises a pneumatic chamber, a piston that is mechanically linked to the rod 30 with a conical tip, which rod 30 is adapted to extend within the head.

The door 20 comprises a frame 35 having a generally rectangular outline.

The frame 35 comprises four sides and three complementary devices 40 adapted to cooperate with the devices 29 of the base 2, which complementary devices 40 are respectively situated at the upper left, bottom left, and bottom right corner.

These complementary devices 40 are provided with a first cylindrical portion and a second cylindrical portion that is hollow and connected to the first portion by a shoulder. This second portion is of smaller diameter than the diameter of the first portion. Furthermore, the second portion is provided with three apertures on the outer surface.

These complementary devices 40 further comprise three balls (not shown) each able to project from the second portion by passing through a respective aperture.

In the closed door position, each second portion of a respective complementary device 40 of the door 20 is inserted into a respective head of a respective device 29 of the base 2.

The devices 29 and complementary devices 40 form, in pairs, a ball-lock pin system provided with a pneumatic jack of double-acting type with a spring (not shown), having an extended position and a retracted position, the operation of which is well-known.

The rod 30 of the device 29 is adapted to be introduced into the hollow second cylindrical portion when the jack is in its extended position.

In this position of the jack, the rod 30 pushes the balls until each of them passes through an aperture, so blocking movement of door the 20 relative to the base 2.

The device 1 further comprises a hinge system by virtue of which the door 20 is hinged to the base 2.

This hinge system is provided with a single hinge 42 comprising a first hinge portion 43 fastened to the top right corner of the frame 35 of the door 20, and a second hinge portion (not shown) fastened to the lateral face 3 of the base 2 of the device 1.

On the upper part of the second hinge portion a mechanical spring (not shown) is arranged with a plastic stop to facilitate the opening and closing of the door 20.

The device also includes a position sensor (not shown) to verify and provide security for the opening and closing of the door 20, by detecting the closed door position and the other position.

A pneumatic system (not shown) is also arranged on the upper part of the second hinge portion so as to supply a system (not shown) for locking the shell 17 and which is situated in the door 20

In the closed door position, the rotational axis about which the first hinge portion 43 of the door 20 pivots is offset relative to a parting surface formed between the shells 16 and 17 when they clamp the bag 10 between them.

This axial offset towards the front of the device 1 enables lateral clearances to be formed between the door 20 and the base 2 at the outer perimeter of the door 20 (FIG. 2).

Thus, the access to the connectors 11 of the bag 10 is greatly facilitated.

Shell 17 has a reference surface 80, which is flat here, and a plurality of shaping channels 81 recessed into that reference surface 80. This shell 17 has a first side 82 and a second side 83 that is an opposite side to the first side 82, a third side 84 and a fourth side 85 that is an opposite side to the third side 84, these third and fourth sides 84 and 85 each meeting the first and second sides 82 and 83.

On its fourth side 85, the shell 17 is provided with three positioning holes 86 for positioning the bag 10, which are arranged facing positioning apertures 73 of the bag 10 in the closed door position, with bag 10 clamped between the shells 16 and 17.

Furthermore, the shell 17 is provided with two other positioning holes 87 for positioning the door 20 in the closed door position, one of which is situated at the first side 82 of the shell 17, and the other at the other extreme, towards the bottom of the shell 17.

These two positioning holes 87 are arranged so as to face positioning apertures 77 of the bag 10 in the closed door position, with the bag 10 clamped between the shells 16 and 17.

In a central zone, the shell 17 further comprises two locking holes 88 of greater diameter than that of the positioning holes 86 and 87 of that shell 17, which locking holes 88 serve for the locking together of the shells 16 and 17.

These two locking holes 88 are situated at the locations where there are the most channels 81 serving for the formation of the conduits 13, since it is at these locations that the force of pressure is greatest during the treatment. The locking holes 88 are thus at least partially surrounded by channels 81.

These locking holes 88 are arranged so as to face locking apertures 75 of the bag 10 in the closed door position, with the bag 10 clamped between the shells 16 and 17.

The shell 16 has a flat reference surface 95 and shaping channels 96 recessed relative to the reference surface 95 (FIG. 4), each facing a corresponding shaping channel 81.

Generally, the surfaces 80 and 95 have similar dimensions and the arrangement of the shaping channels 96 is the mirror image of the set of the shaping channels 81.

The shaping channels 81 and 96 are of semi-elliptical cross-section.

The surfaces 80 and 95 may be applied against each other with the channels 81 and 96 in register with each other to delimit a network of cavities which are each generally tubular.

Figure 6:
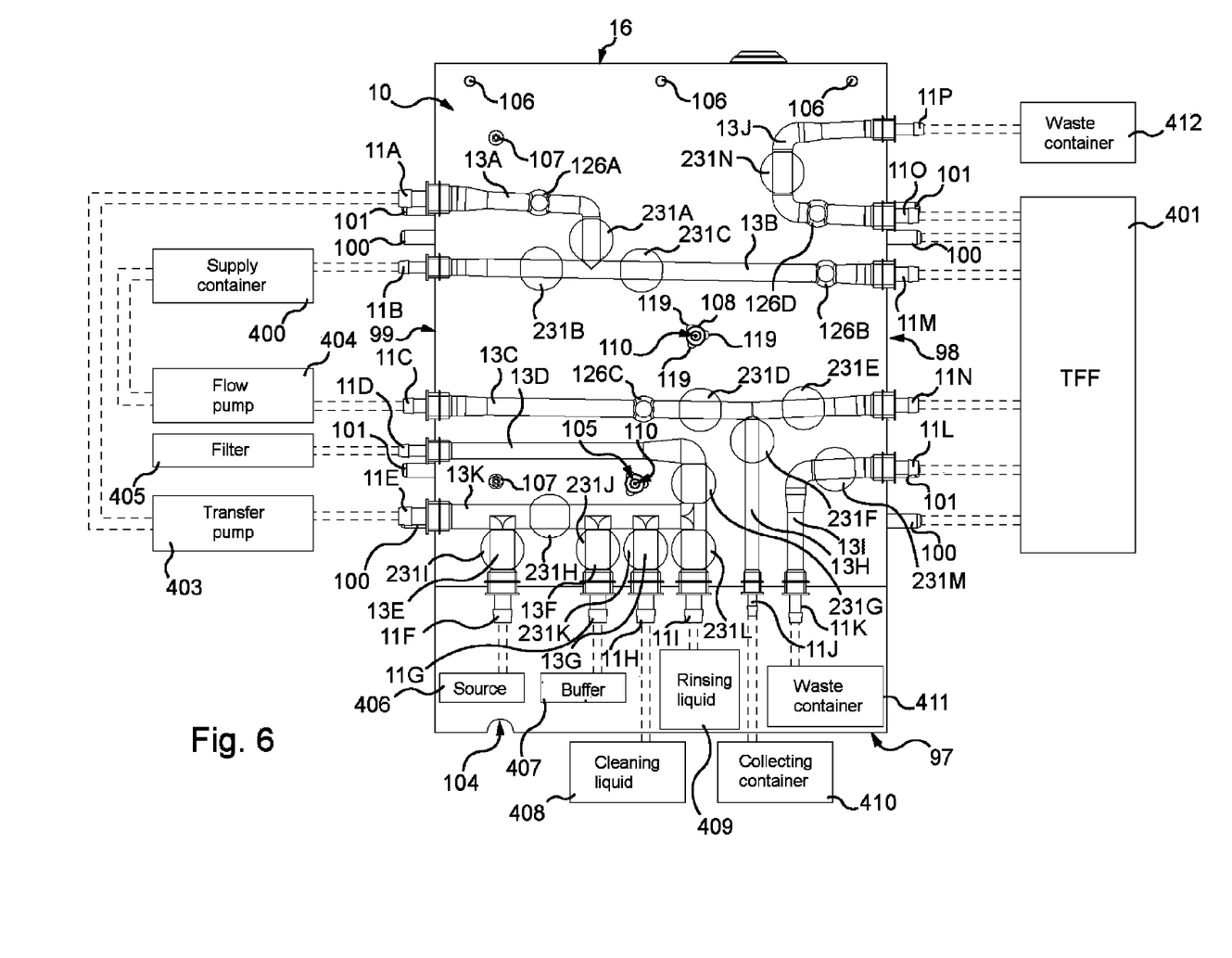
FIG. 6 is a front view of the first shell, on which is mounted a bag for the treatment of liquid by tangential filtration.

The shell 16 has a first side 145 and a second side 146 that is an opposite side to the first side 145, a third side 147 and a fourth side 148 that is an opposite side to the third side 147, which third and fourth sides 147 and 148 each meet the first and second sides 145 and 146 (FIG. 6).

The shell 16 furthermore has, on the opposite lateral walls 98 and 99, dowels 100 adapted to be engaged, by virtue of a vertical translational movement from top to bottom when the shell 16 is against the chassis 25, in the hooking claws 26 disposed on that chassis 25.

Furthermore, on those same opposite lateral walls 98 and 99, the shell 16 has rods 101 for manipulating the shell 16.

This manipulation is carried out by the user of the device 1, or with the help of a winch, which may for example be electric.

Thanks to the inclination and the weight of the shell 16, and thanks to the engagement of the dowels 100 in the hooking claws 26, the shell 16 is securely fastened to the chassis 25.

On its flat reference surface 95, the shell 16 furthermore has a re-entrant portion 102 which is extended downwardly by a slanting surface 103, the slant of which is directed inwardly of the device 1.

This slanting surface 103 enables the provision of access to the bay 46 comprising the containers.

On a lower face 97, the shell 16 further comprises a channel 104 of inverted gutter shape emerging on the slanting surface 103 (FIG. 1).

This channel 104 serves as a fool-proof device on installation of the shell 16 on the chassis 25 of the base 2, in order for the reference surface 95 to be turned inwardly.

The shell 16 further comprises, at the location of its fourth side 148, three hooking studs 106, of which two are disposed on respective opposite sides of the shell 16, the third being disposed substantially at the center of the fourth side 148 of the shell 16, with those three studs 106 being evenly spaced from each other.

These studs 106 are adapted pass through the positioning apertures 73 of the bag 10 for the suspension of the latter on the shell 16.

Furthermore, the distal end of these same hooking studs 106 is adapted to be inserted into the positioning holes 86 of the shell 17 in the closed door position.

The shell 16 comprises two positioning dowels 107 for positioning the door 20, one of which is situated on the fourth side 148 of the shell 16 close to a hooking stud 106 situated at the top left of that shell 16, the other positioning dowel 107 being situated at the other extreme, that is to say at the bottom of the shell 16, between two shaping channels 96 at the location of the third side 147.

These positioning dowels 107 are adapted to pass through the apertures 77 of the bag 10, and the distal end of these positioning dowels 107 is adapted to be inserted into the positioning holes 87 of the shell 17.

The shell 16 further comprises two locking holes 108 which are situated at the locations where there are the most channels 96 serving for the formation of the conduits 13, since it is at these locations that the force of pressure is greatest during the treatment. The locking holes 108 are thus at least partially surrounded by channels 96.

These locking holes 108 are arranged so as to face the locking through-apertures 75 of the bag 10 when it is disposed on the shell 16, and also to face the corresponding locking holes 88 of the shell 17 in the closed door position.

The locking holes 108 of the shell 16 are passed through by the ball-lock pins 110 for the locking together of the shells 16 and 17 when the door 20 is in its closed position, and for the clamping of the bag 10 in the circuit 8.

Each ball-lock pin 110 comprises a body connected to the shell 16, and an annular shoulder provided with a transverse face and connected to a head (which are not shown). The body comprises a pneumatic chamber and a piston, the piston being mechanically connected to a rod with a conical tip (not shown). This rod extends in the head of the pin 110 and three balls 119 (FIG. 6) are arranged so as to be able to project from the head by passing through apertures formed in that head. The pin 110 is similar to a double-acting type jack and has an extended position and a retracted position.

The head of each pin 110 passes through the corresponding locking hole of the shell 16, this head also passes through the corresponding locking aperture 75 of the bag, and this head lastly emerges into a corresponding locking hole 88 of the shell 17 in the closed door position.

When a first portion of the pneumatic chamber of the pin 110 is placed under pressure, the piston is acted upon. When the piston is at end of travel, the balls 119 are in extended position, that is to say that they project from the head to extend into the locking hole 88 of the shell 17.

The locking holes 88 are configured such that, when the balls 119 are extended, the shells 16 and 17 are securely locked.

When a second portion of the pneumatic chamber of the pin 110 is placed under pressure, this second portion being opposed to the first portion, the piston is urged towards the other end of travel position. When that position is reached, the balls 119 are in retracted position, that is to say they go back into the head.

Figure 3:
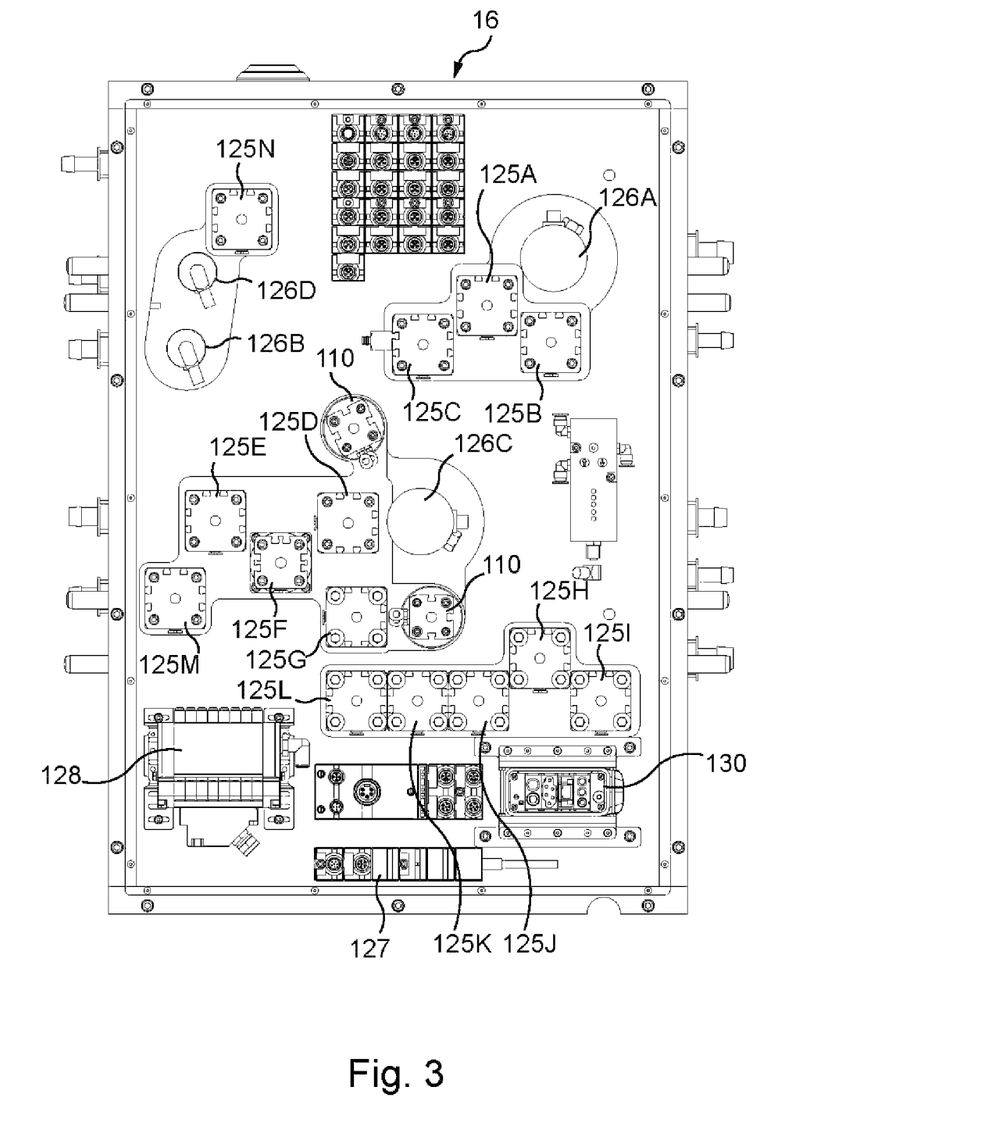
FIG. 3 is a view from behind of a first shell of the device, with a back panel removed.

In addition to the shells 16 and 17, the device 1 comprises, here installed on the back of the shell 16 instruments required for the treatment of the biological liquid illustrated in FIG. 3.

There are illustrated pinch valves 125A to 125N (FIG. 3) comprising actuators 221 (FIGS. 4 and 5) to pinch a conduit 13 so as to prevent or allow the passage of liquid in that conduit 13, and pressure sensors 126A to 126D.

Also illustrated are a pneumatic distributor 128 and means for verification and control to perform various treatments of that liquid, which means are formed for example by a verification and command unit 127.

Figure 4:
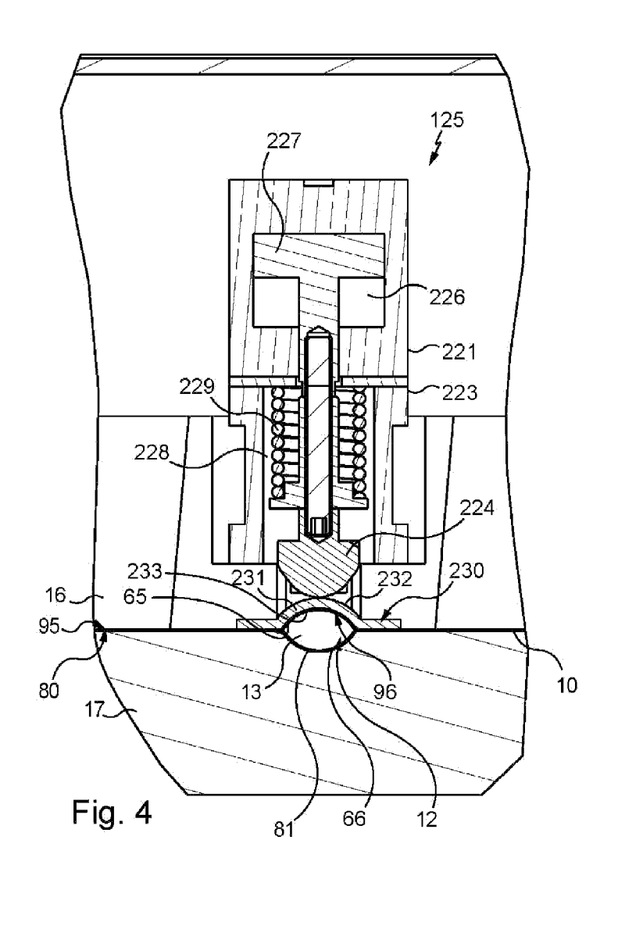
FIGS. 4 and 5 are cross-section views of the device, respectively with an open valve and with a closed valve.
Figure 5:
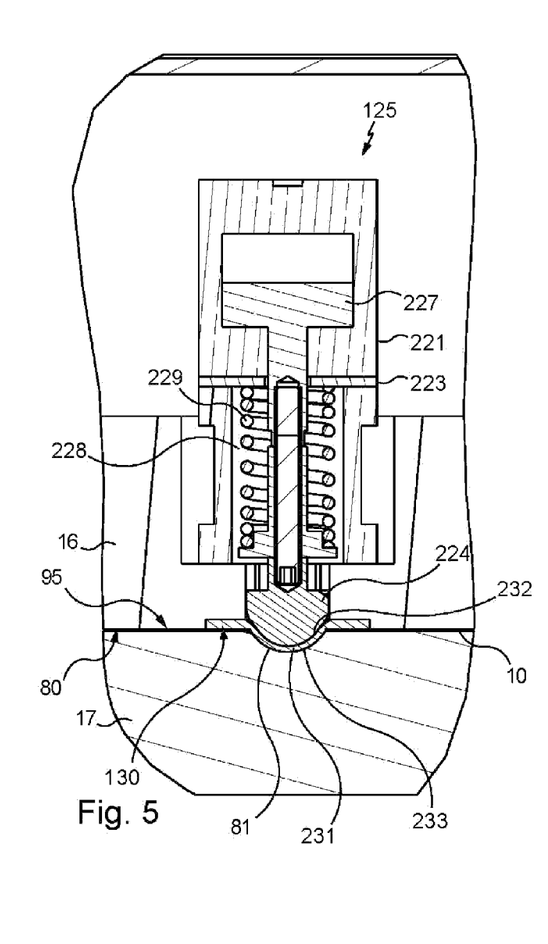

In the example illustrated in FIGS. 4 and 5, the actuators 221 each comprise a body 223 fastened to the shell 16 and a moveable pinching finger 224 having a retracted position when the valve 125 is in open position and an extended position when the valve 125 is in closed position.

The body 223 comprises a pneumatic chamber 226, a piston 227 and an accommodation 228 provided with a spring 229 accommodated in the shell, with the spring 229 surrounding a rod linking the piston 227 and the finger 224.

The pneumatic chamber 226, when it is under pressure, biases the piston 227 against the spring 229. When the piston 227 is at the end of its stroke, the finger 224 is in retracted position (FIG. 4).

When the pneumatic chamber 226 is at atmospheric pressure, the spring 229 biases the piston 227 towards the other position of end of stroke. When the latter is reached, the moveable finger 224 is in extended position (FIG. 5).

At its distal end, the moveable finger 224 is shaped like the profile of the shaping channel 81 of the shell 17.

In the extended position, the moveable finger 224 projects into one of the channels 81.

The valve 125 further comprises, in register with the moveable finger 224, an elastically compressible pad 231, which pad 231 forms part of an individual local plate 230 of silicone molded in one piece (see also FIG. 1).

This pad 231 has a first face 232 nearest the moveable finger 224 and a second face 233 nearest the pipe to pinch 13.

The second face 233 of the pad 231 is concave and locally delimits the shaping channel 96 of the shell 16.

Each actuator 221 enables a pipe 13 to be pinched between its moveable finger 224 and shell 17, to allow or prevent the passage of the liquid at that location.

To pinch the pipe 13, the valve 125 passes from its open position (FIG. 4) in which the moveable finger 224 is in a retracted position in which it does not pinch the pipe 13, to its closed position (FIG. 5) in which the moveable finger 224 is in an extended position in which it pinches the pipe 13.

The finger 224, at the time it is extended, pushes the pad 231 towards the shaping channel 81 of the shell 17.

Thus, the pad 231 passes from a resting configuration in which its second face 233 is concave and locally delimits the shaping channel 96 of the shell 16 of the pipe 13 to pinch, to a pinching configuration in which its second face 233 is convex, with the pipe 13 and the pad 231 sandwiched between the shaping channel 81 of the shell 17 of the pipe to pinch 13 and the moveable pinching finger 224.

Furthermore, each sensor 126A-D is fastened to the shell 16 in register with a channel 96, with the distal end of the sensor 126 emerging into that channel 96, without actually having to touch the fluid (not shown).

Such pressure sensors measure the pressure via the outer surface of the bag 10.

The shell 16 further comprises, here installed behind that shell 16, a female connector 130 enabling power to be supplied to the valves 125A-N, sensors 126A-D the distributor 128 and the verification and control unit 127, which are integrated into that shell 16 (FIG. 3).

The supply is thus electrical (for power and control) and pneumatic.

This female connector 130 is situated at the bottom right of the shell 16 (viewed from behind).

When the rear part of the shell 16 is covered by a back panel (not shown), only the access to the female connector 130 is possible.

A male connector (not shown) arranged on the base 2 of the device 1 can be connected to the female connector 130 of the circuit 8.

The bag 10 comprises two flexible films 65 and 66 connected to each other by a seal delimiting a closed contour (FIGS. 4 and 7), and the connectors 11 of the conveying network 12).

Thus, each of the films 65 and 66 is a PureFlex™ film from the applicant.

This is a co-extruded film comprising four layers, respectively, from the inside to the outside, a layer of ultra low density polyethylene (ULDPE) forming the material for contact with a liquid, a copolymer of ethylene and vinyl alcohol (EVOH) forming a barrier to gases, a copolymer layer of ethylene and vinyl acetate (EVA) and a layer of ultra low density polyethylene (ULDPE) forming the outer layers.

The seal is a weld bead formed at the periphery of the films 65 and 66 at the location of the conduits 13.

The conduits 13 (13A to 13K in FIGS. 6 and 7) are formed on the passage of a liquid.

The closed contour of the bag 10 forms a liquid treatment zone 67 (FIG. 7), in which extend the conduits 13A-K.

The closed contour has a first side 68, a second side 69 that is an opposite side to the first 68, a third side 70 meeting the first and second sides 68 and 69 and a fourth side 71 that is an opposite side to the third side 70 and that meets the first and second sides 36 and 69. The connectors 11A to 11P of the conveying network 12 emerge inside and outside the first, second, and third sides 68, 69, and 70, as can be seen more particularly in FIG. 7.

The dimensions of the bag 10 correspond to those of the surfaces of the shells 16 and 17.

The bag 10 is provided for clamping between by the shells 16 and 17 with one of the faces of the bag 10 in contact with the face of the shell 16, and with the other face of the bag 10 being in contact with a face of the shell 17.

At its fourth side 71, the bag 10 further comprises the three through apertures 73 for positioning which were referred to above.

These positioning apertures 73 are aligned and regularly spaced apart, two of the apertures 73 being situated on respective opposite sides of the fourth side 71 of the bag 10, and the other aperture 73 being situated in the center of the fourth side 71 of the bag 10.

These positioning apertures 73 serve for the positioning of the bag 10 on the shell 16.

The bag 10 further comprises, in its treatment zone 67, the two through apertures 75 referred to above for locking the shells 16 and 17 together, these locking apertures 75 having a greater diameter than the positioning apertures 73.

These locking apertures 75 are situated in the treatment zone 67 at the locations where there are the most conduits 13, since it is at these locations where the force of pressure is greatest during the treatment. The locking apertures 75 are thus at least partially surrounded by conduits 13.

The bag 10 further comprises two other positioning apertures 77 referred to above which serve for the positioning of the door 20 in the closed door position of the device.

One of the positioning apertures 77 is situated at the fourth side 71 of the bag 10 in the vicinity of the positioning aperture 73 situated at the top left of the bag 10, and the other positioning aperture 77 is situated at the opposite extreme, that is to say towards the bottom of the bag 10, in the treatment zone 67.

Figure 7:
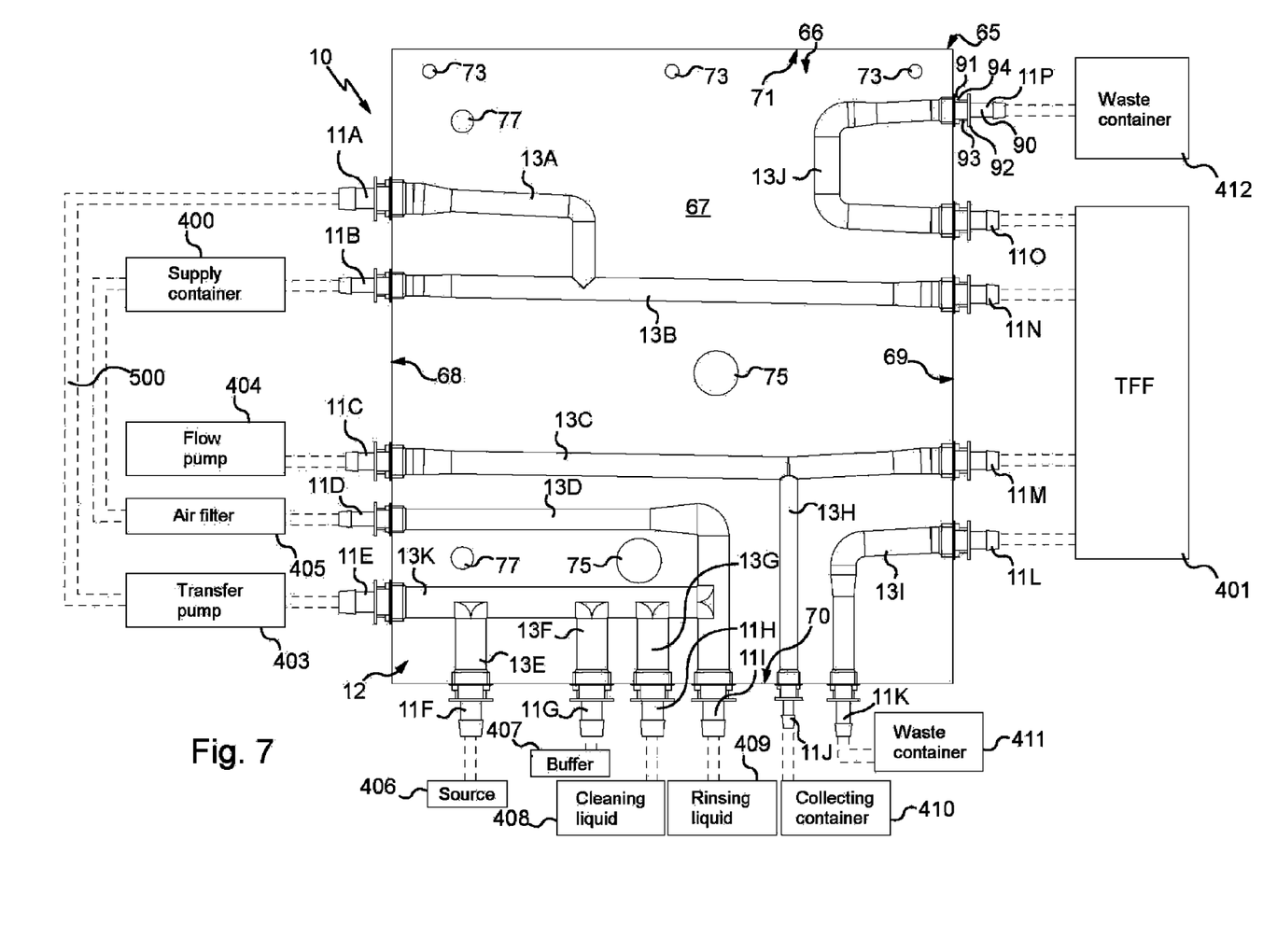
FIG. 7 is a front view of the bag in isolation.

A more detailed description will now be given of the conduits 13A to 13K and the connectors 11A to 11P of the bag 10, as well as the valves 125A to 125N and the sensors 126A to 126D which are integrated into the shell 16 and the components of the surroundings which cooperate with the conduits 13A to 13K and the connectors 11A to 11P, with reference to FIGS. 6 and 7.

The treatment components of the surroundings are formed in particular by diaphragm type pumps, by various containers and by other measuring instruments, as will be seen below.

These treatment components of the surroundings are here diagrammatically represented and placed against and connected to the bag 10, which is mounted on the shell 16 (FIG. 6), or only to the bag 10 (FIG. 7), but in reality, these components are disposed on one or more other devices, for example placed against the device 1.

These other devices are advantageously carts like the device 1.

Of course, the connections which will be described below may be formed before fastening the bag 10 by suspension onto the shell 16, without being hindered subsequently, that is to say at the time of suspending that bag 10 on the shell 16, by the hinge system, or after the suspension of that bag 10.

On its first side 68, the bag 10 comprises a connector 11B linked to a conduit 13B which extends horizontally across the length of the bag 10 starting from the connector 11B to the second side 69 of the bag 10 where it is joined to a connector 11N.

The connector 11B is connected to a supply container 400 and the connector 11N is connected to a tangential filter 401.

On its first side 68, the bag 10 further comprises, above the connector 11B, a connector 11A linked to a conduit 13A which comprises a first section extending horizontally starting from that connector 11A then a bent second section and lastly a third section extending vertically downwards until it enters the conduit 13B, in the manner of a T-shaped branching connector.

The connector 11A is connected to a transfer pump 403.

Still on its first side 68, the bag comprises, under the connector 11B, a connector 11C linked to a conduit 13C which extends substantially horizontally across the length of the bag 10 starting from the connector 11C to the second side 69 of the bag 10 where that conduit 13C is joined to a connector 11M.

The connector 11C is connected to a flow pump 404 and the connector 11M is connected to the tangential filter 401.

Advantageously, the flow of the product between the flow pump 404 and the tangential filter 401 is made in a substantially straight section, directly, and over the length of the bag. In other words, the length of the bag comprising the product is very short.

Under the connector 11C, the bag 10 also comprises a connector 11D linked to a conduit 13D which has a first section extending horizontally over more than half the length of the bag 10, a bent second section and a third section which extends vertically downwards to the third side 70 of the bag 10 where that third section is joined to a connector 11I.

The connector 11D is connected to an air filter and the connector 11I is connected to a container 409 for rinsing liquid.

The bag 10 further comprises, still on its first side 68, under the connector 11D, a connector 11E linked to a conduit 13K which extends horizontally over more than half the length of the bag 10 from the connector 11E until it enters the third section of the conduit 13D which extends vertically downwards to the connector 11I.

The connector 11E is connected to a transfer pump 403, which transfer pump 403 is connected via a transfer section 500 to the connector 11A of the bag 10.

On its third side 70 (the bottom of the bag 10) the bag 10 comprises a connector 11F linked to a conduit 13E which extends vertically upwards from the connector 11F until it enters the horizontally extending conduit 13K.

The connector 11F is connected to a container of source product.

On its third side 70, the bag 10 further comprises a connector 11G linked to a conduit 13F which extends vertically upwards from the connector 11G until it enters the conduit 13K.

The connector 11G is connected to a container 407 of buffer product.

Still on its side 70, the bag 10 comprises a connector 11H linked to a conduit 13G which extends vertically upwards from the connector 11H until it enters the conduit 13K.

The connector 11H is connected to a container 408 for cleaning liquid.

The connectors 11F, 11C and 11H are situated between the lower left corner of the bag 10 and the connector 11I described above.

After this connector 11I (that is to say between this connector and the lower right corner of the bag 10), the bag 10 comprises a connector 11J linked to a conduit 13H which extends vertically upwards from the connector 11J until it enters the conduit 13C in the in the manner of a T-shaped branching connector.

The connector 11J is connected to a collecting container 410 for treated liquid.

It is to be noted that the conduit 13C thus has two sections, one extending between the connector 11C and the intersection with the conduit 13H, and the other extending between the connectors 11M and the intersection with the conduit 13H.

Each section of this conduit 13C is substantially horizontal, however with a slope respectively away from the connector 11C, 11M up to the intersection with the conduit 13H, of the order of a few degrees (for example 2 to 3°).

Still on its third side 70, the bag 10 comprises a connector 11K linked to a conduit 13I which has a first section extending vertically upwards from the connector 11K, a second section bent towards the second side 69 of the bag 10, and a third section extending substantially horizontally from the bent second section to the second side 69 of the bag 10 where the conduit 13I is joined to a connector 11L.

The connector 11K is connected to a waste container 411 and the connector 11L is connected to the tangential filter 401.

This connector 11L is furthermore situated under the connector 11M described above, which is situated under the connector 11N also described above.

On its second side 69, above the connector 11N, the bag 10 comprises a connector 11O joined to a conduit 13J which has a first section extending substantially horizontally from the connector 11O towards the first side 68 of the bag 10 (with a slightly positive slope), a second section bent upwards, a third section which extends vertically upwards, a fourth section bent towards the second side 69 of the bag 10, and a fifth section which extends substantially horizontally from the bent third section to the second side 69 of the bag where the conduit 13J is joined to a connector 11P (with a slightly positive slope).

The fifth section of the conduit 13J comprises, in proximity to the bent third section, a neck.

The connector 11O is connected to the tangential filter 401 and the connector 11P is connected to a waste container 412.

The shell 16 comprises a pressure sensor 126A on the first portion of the conduit 13A and a pressure sensor 126B on the connector 11N of the conduit 13B.

The shell 16 further comprises a valve 125A and an elastic buffer 231A situated on the vertical third section of the conduit 13A and a valve 125B and a buffer 231B on the conduit 13B between the connector 11B and the intersection between the connectors 13A and 13B, and a valve 125C and an elastic buffer 231C on the conduit 13B between that intersection and the pressure sensor 126B.

The shell 16 comprises a valve 125D and an elastic buffer 231D on the conduit 13C in the vicinity of the intersection of that conduit 13C with the conduit 13H, between the connector 11C and that intersection. On that same conduit 13C, between the intersection and the connector 11M the shell comprises a valve 125E and an elastic buffer 231E.

Furthermore, the shell 16 comprises a pressure sensor 126C on the conduit 13C between the valve 125D associated with the buffer 231D and the connector 11C.

This shell 16 further comprises a valve 125F and an elastic buffer 231F on the conduit 13H in the vicinity of the intersection between that conduit 13H and the conduit 13C.

The shell 16 also comprises a valve 125G and an elastic buffer 231G at the third section of the conduit 13D, just after the bent second section, and before the location of that third section where the conduit 13K enters.

The shell 16 further comprises a valve 125H and an elastic buffer 231H on the conduit 13K between the location of that conduit 13K where the conduit 13E enters and the location of that conduit 13K where the conduit 13F enters.

The shell 16 comprises a valve 125I and an elastic buffer 231I on the conduit 13E.

The shell 16 comprises a valve 125J and an elastic buffer 231J on the conduit 13F.

The shell 16 comprises a valve 125K and an elastic buffer 231K on the conduit 13G.

The shell 16 comprises a valve 125L and an elastic buffer 231L on the third section of the conduit 13D, but contrary to the valve 125G and the elastic buffer 231G, this valve 125K and this buffer 231K are situated between the connector 11I and the location of the third section of the conduit 13D where the conduit 13K enters.

The shell 16 further comprises a valve 125M and an elastic buffer 231M on the third section of the conduit 13I, that is to say between the bent second section and the connector 11L.

The shell 16 lastly comprises a valve 125N and an elastic buffer 231N on the third section (which is vertical) of the conduit 13J, as well as a pressure sensor 126D situated on the first section of that conduit 13J, just before the second section which is bent.

Each connector 11A to 11P has a semi-elliptical cross-section and is provided with a longitudinal conduit 90 on which are formed two annular walls 91 and 92 defining between them a tubular portion 93, the annular wall 91 being juxtaposed against the films 65 and 66 of the bag 10 and the annular wall 92 being offset relative to its films 65 and 66 towards the end of the conduit 90 at which a pipe is connected for its connection to a component in the vicinity.

The films 65 and 66 of the bag 10 are sealed around the tubular portion 93 of each connector 11 at a collar 94.

A description will now be made in more detail of the circuit for processing liquid by tangential filtration, with reference to FIG. 8, with the components in the vicinity.

Figure 8:
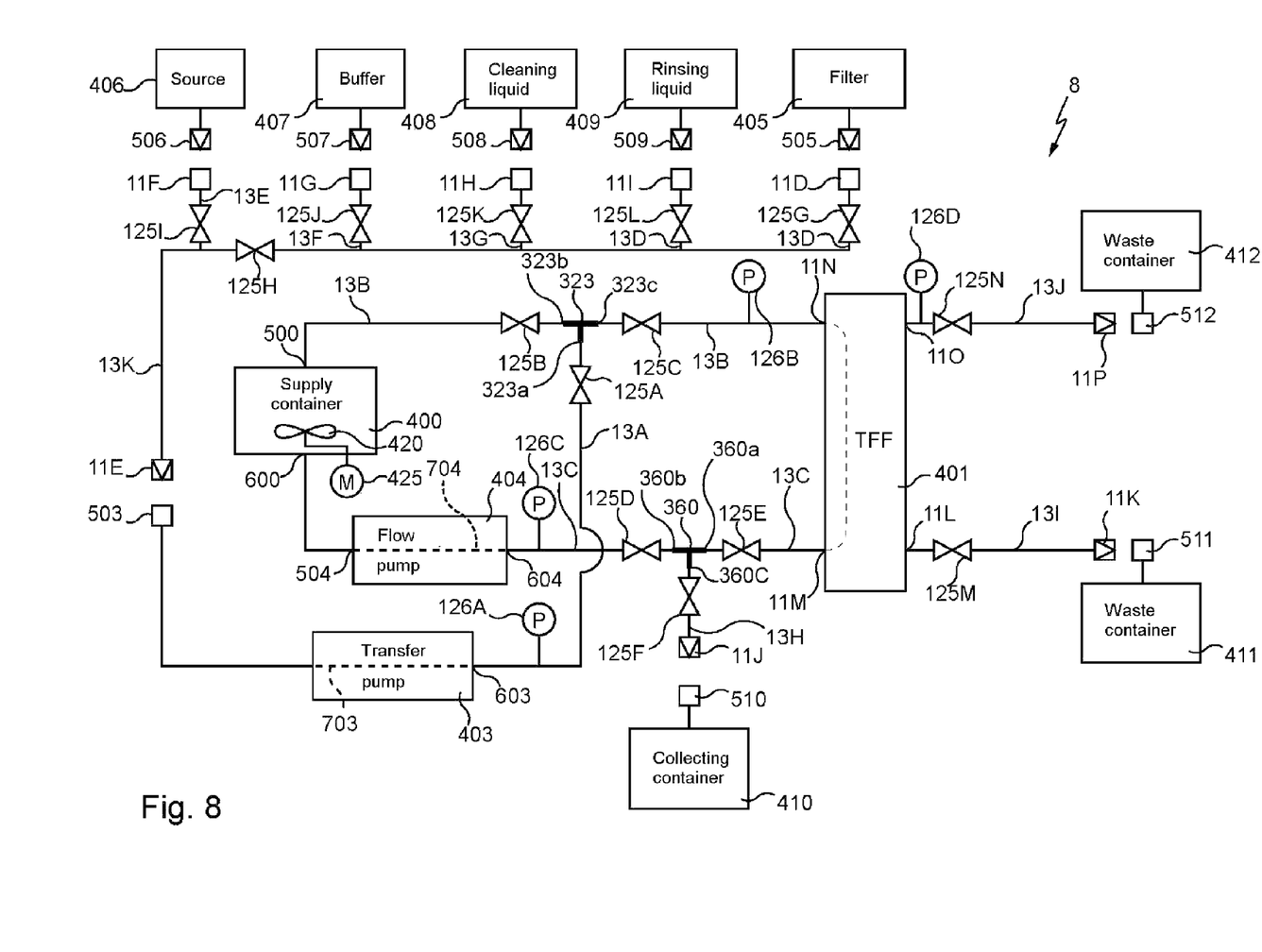
FIG. 8 is a diagrammatic view of the circuit of an installation for treatment of liquid by tangential filtration.

FIG. 8 diagrammatically shows the circuit 8 provided by press 9 and bag 10. In this circuit the valves 125A to 125K are respectively formed by an actuator 221, and by the portion of the shell 17 against which the conduit 13 presses when it is pinched by the finger 224.

The liquid to be treated is initially in a source bag 406, filled with liquid from the bioreactor or from the previous treatment. This source bag 406 is connectable via a male connector 506 to the transfer conduit 13E which extends between a female connector 11F and another female connector 11E, that transfer conduit 13E being connectable via its female connector 11E, to a transfer section, which is connectable to the transfer conduit 13A which extends between its female connector 11A to a first aperture 323a of a T-shaped branching connector 323 (formed by the crossing of the conduits 13B and 13C).

This transfer section comprises disposable flexible conduits, a transfer pump 403 to make the liquid circulate (here a peristaltic pump) and two valves 125A and 125I.

The term "conduit" must be understood in the present document as being a portion of tubing connecting two elements of the circuit, it being possible for this portion equally well to comprise a unique tube or on the contrary several tubes, possibly having different diameters, connected in series by a simple connector (not playing any other role here) or sophisticated connector (for example a disposable connector for a pressure sensor (or for a sensor of another physicochemical value).

The pump 403 is passed right through by a conduit (from a first point of inlet/outlet 703 to a second point of inlet/outlet 603) such that the conduit may be compressed by the pump 403.

The valve 125A is implanted on the conduit 13A near the branching connector 323 in order to allow or prevent the flow of liquid in the conduit.

The transfer section also comprises a connector for the pressure sensor 126A.

The valve 125I is implanted on the pipe 13E close to the female connector 11F.

The operator has the possibility of linking other bags 407, 408, 409 and a filter 405 to a transfer conduit 13K meeting the conduit 13E, via the respective male connectors 507, 508, 509 and 505 which may connect into the respective female connector 11G, 11H, 11I and 11D.

These bags 407, 408 and 409 respectively contain a buffer liquid (saline solution), a cleaning liquid (sodium hydroxide) and a rinsing liquid (water) to manage the state of cleanliness of the circuit or to push the treated liquid towards the components which perform the treatment or towards the collecting container, and the filter is an air filter.

The conduit 13B has two sections, one of which is for filling (between the connector 11A and the intersection of the conduit 13B and the conduit 13A) and the other is for filtration (between the connector 11N and the intersection of the conduit 13B and the conduit 13A), which sections extend respectively from a second aperture 323b and a third aperture 323c of the branching connector 323.

The filling section which meets an inlet/outlet aperture 500 of the flexible disposable supply container 400, comprises a valve 125B implanted in the vicinity of the branching connector 323 (also disposable).

A stir bar 420 actuated by an electromagnetic drive 425, is disposed in the container 400 in order to make the liquid contained therein homogenous.

The conduit 13C has two sections, one of which forms a filtration section which joins a first aperture 360a of a T-shaped branching connector 360, and comprises a connector for the pressure sensor 126C, two isolation valves 125D and 125E and the tangential connector 401, and the other a supply section.

The conduit 13B links the third aperture 323c of branching connector 323 to a first inlet/outlet aperture of the filter 401 via the connector 11N.

The conduit 51 links a second inlet/outlet aperture of the filter 401 to the first aperture 360a of the branching connector 360 via the connector 11M.

The measurement made by the pressure sensor 126B makes it possible to know the functional state of the tangential filter 401.

Valve 125C is implanted on conduit 13B close to the branching connector 323, whereas the valve 125E is implanted on the conduit 13C close to the branching connector 360.

A supply section and a collecting section respectively extend from a second aperture 360b and from a third aperture 360c of the branching connector 360.

The supply section joins to an outlet aperture 600 of the supply container 400. It comprises a disposable flexible conduit, a flow pump 404 to make the liquid flow (here, a peristaltic pump), a valve 125D implanted on the conduit 13C close to the branching connector 360, and a connector for the pressure sensor 126C inserted in series in conduit 13C.

The supply section has a portion 704 passing right through pump 404 (from an inlet point 504 to an outlet point 604) such that it may be compressed by the pump.

The supply section further comprises a section of the conduit 13C situated between the valve 125D and the connector 11C connected to the flow pump 404.

The collecting section meets the female connector 11J. It comprises solely the conduit 13H and the isolation valve 125F implanted on the conduit 13H close to the branching connector 360.

Depending on the operations carried out, the connector 11J may be connected either to a male connector 511 of a waste container 411, or to the male connector 510 of a collecting container 410.

The tangential filtration treatment circuit also comprises two conduits 13J and 13I for conveying the filtrate which respectively extend from outlet points of the filter 401 via the respective connectors 11O and 11L of the bag 10, the conduits 13J and 13I being connected via the respective connectors 11P and 11K to the respective male connectors 512 and 511 of the respective collecting containers 412 and 411. It is possible to interpose a flow meter (not shown) such that the volume and the rate of flow of the filtrate recovered at the outlet of the filter 401 can be determined.

The respective valves 125N and 125M are respectively implanted in the respective conduits 13J and 13I, close to the filter 401, and a connector for the pressure sensor 126D is implanted in the conduit 13J, between the valve 125N and the filter 401.

The measurement made by the pressure sensor 126D, in conjunction with the measurement made by the pressure sensor 126B, enables the functional state of the tangential filter 401 to be checked precisely.

The operation of this circuit will now be described.

The valves 125C, 125 and 125F are closed in order to prevent any flow of liquid in the filtration and collecting sections, the other valves being open.

The source bag 406 is joined to the transfer section by connecting the male connector 506 to the female connector 11F and by connecting the male connector 503 to the female connector 11E.

The liquid to treat is next sucked from the source bag 406 by the transfer pump 403 and is conveyed to the supply container 400 via the transfer section 13A and filling section 13B.

After the complete transfer of the liquid to treat into the circuit, the bag 407 containing the buffer liquid is connected via the connector 507 to the connector 11G. This buffer liquid is then introduced into transfer section 13A thanks to transfer pump 403 in order to push the liquid to treat towards the conduit 13B such that the entirety of that liquid can be filtered and retrieved. The conduit 13A is next isolated from the conduit 13B by closing the valve 125A.

Once the transfer has been carried out, the valves 125E and 125D are opened, the liquid to treat is made to flow by the actuation of the flow pump 404, in the sub-circuit formed by the supply section. After the passage of the liquid into the tangential filter 401, the retentate comes back to the supply container 400 whereas the filtrate is evacuated via the conduits 13J and 13I to be collected in the waste containers 411 and 412.

The operation of making the liquid to treat flow into filter 401 is continued until the liquid attains the desired concentration.

The collection of the filtered liquid is then carried out in two successive sub-steps.

The first sub-step consists of recovering the filtered liquid contained in the filtration section formed by a section of the conduit 13B and in the filter 401.

For this, the valve 125B is closed whereas valve 125A is opened so as to place the transfer and filtration sections in communication, and to isolate them from the filling section formed by the other section of the conduit 13B.

In parallel, the valve 125D is closed whereas the valves 125F and 125E are opened so as to place in communication the filtration section formed by a section of the conduit 13B and the collecting section formed by the conduit 13H, and to isolate them from the supply section.

The female connector 11J is connected to the male connector 510 of the collecting container 410.

Buffer liquid is then conveyed into the transfer section (conduit 13A) by virtue of the transfer pump 403 in order to transfer, via the collecting section (conduit 13H), the buffer liquid, and thereby the remainder of the filtered liquid contained in the filtration section (portion of conduit 13B and conduit 13C) and the filter 401 to the collecting container 410.

The second sub-step consists of collecting the filtered liquid contained in the filling (portion of conduit 13B) and supply (conduit 13C) sections, and in the supply container 400.

For this, the valve 125C is closed whereas the valve 125B is opened so as to place in communication the transfer (conduit 13A) and filling (portion of conduit 13B) sections, and to isolate them from the filtration section (other portion of conduit 13B and conduit 13C).

In parallel, the valve 125E is closed whereas the valve 125D is opened so as to place in communication the supply (section of the conduit 13C) and collecting (conduit 13H) sections, and to isolate them from the filtration section (other section of the conduit 13B and other section of the conduit 13C).

Buffer liquid is next conveyed into the transfer section (conduit 13A) by virtue of the transfer pump 403 in order to transfer the filtered liquid contained in the filling section (other section of the conduit 13B) into the supply container 400.

The flow pump 404 next enables that liquid to be brought from the container 400 to the collecting container 410, via the supply and collecting sections.

In a variant not illustrated, the pumps are of diaphragm type rather than peristaltic.

In a variant not illustrated, the dimensions of the bag 10 do not match those of the surfaces of the shells 16 and 17, being larger or smaller.

It should be noted more generally that the invention is not limited to the examples described and represented.

The invention claimed is:

1. A device for an installation for biological liquid treatment by tangential filtration, comprising a circuit comprising:
   a bag provided with a plurality of connectors and a network for conveying liquid between said connectors, said conveying network being formed by a plurality of conduits, the bag further comprising two flexible films fastened to each other, said conduits being formed between said flexible films;
   a press comprising a first shell and a second shell mounted on said first shell, said first shell and second shell cooperating with said bag to form the conduits of said conveying network between said flexible films, by clamping said bag between said first shell and said second shell; and a plurality of valves;

a first conduit extending longitudinally between a flow pump connector emerging on a first side of said bag and a tangential filter connector emerging on a second side of said bag which is an opposite side to said first side;

a second conduit extending longitudinally from a first side of said conduit between a supply container connector emerging on said first side of said bag, and another tangential filter connector emerging on said second side of said bag which is an opposite side to said first side;

a third conduit extending from a second side of said conduit, which is an opposite side to said first side of said conduit, starting at a collecting container connector, until it enters said first conduit;

a fourth conduit extending from the first side of said conduit, starting at a transfer pump connector, until it enters said second conduit; and at least a first valve being situated on said first conduit, at least a second valve being situated on said second conduit, a third valve being situated on said third conduit, and a fourth valve being situated on said fourth conduit.

2. A device according to claim 1, wherein the bag comprises a fifth conduit connected to a transfer pump connector, and a sixth conduit extending from a source container connector until it enters said fifth conduit, and the device comprises a fifth valve situated on said fifth conduit and a sixth valve situated on said sixth conduit.

3. A device according to claim 2, wherein the bag comprises at least a seventh conduit which extends from a buffer and/or cleaning container connector until it enters said fifth conduit, and the device comprises at least a seventh valve situated on said seventh conduit.

4. A device according to claim 3, wherein the bag comprises an eighth conduit which extends between an air filter connector and a rinsing container connector, said fifth conduit entering said eighth conduit, and the device comprises at least one eighth valve situated on said eighth conduit.

5. A device according to claim 4, wherein the bag comprises at least a ninth conduit which extends between a tangential filter connector and a waste container connector, and the device comprises at least a ninth valve situated on said ninth conduit.

6. A device according to claim 1, further comprising a pressure sensor situated on at least one said conduit.

* * * * *